(12) United States Patent
Al-Jaf et al.

(10) Patent No.: US 11,536,591 B2
(45) Date of Patent: Dec. 27, 2022

(54) MAGNETIC ENCODER

(71) Applicant: ZF Automotive UK Limited, Solihull (GB)

(72) Inventors: Ari Akbar Hassan Al-Jaf, Birmingham (GB); Harvey Smith, Worcestershire (GB); John Gorton, Birmingham (GB)

(73) Assignee: ZF Automotive UK Limited

( * ) Notice: Subject to any disclaimer, the term of this patent is extended or adjusted under 35 U.S.C. 154(b) by 53 days.

(21) Appl. No.: 17/187,944

(22) Filed: Mar. 1, 2021

(65) Prior Publication Data
US 2021/0278252 A1    Sep. 9, 2021

(30) Foreign Application Priority Data
Mar. 3, 2020  (GB) .................................... 2003064

(51) Int. Cl.
 *G01D 5/249*  (2006.01)
(52) U.S. Cl.
 CPC .................................. *G01D 5/2497* (2013.01)
(58) Field of Classification Search
 CPC .... G01D 5/145; G01D 5/24442; G01D 5/245; G01D 5/2451; G01D 5/2454; G01D 5/2455; G01D 5/2497
 See application file for complete search history.

(56) References Cited

U.S. PATENT DOCUMENTS 3,185,920 A * 5/1965 Brunner ................. G01R 33/07
                                                                                323/368
5,898,301 A    4/1999 La Croix et al.
(Continued)

FOREIGN PATENT DOCUMENTS

EP    1296144 A2    2/2004
EP    2579002 A1    4/2013
(Continued)

OTHER PUBLICATIONS

German Search Report for corresponding German Application Serial No. 203135-DE-NP, dated Aug. 12, 2021, pp. 1-12.
(Continued)

*Primary Examiner* — Steven L Yeninas
(74) *Attorney, Agent, or Firm* — Robert James Harwood

(57) ABSTRACT

A magnetic encoder comprising an encoder element having at least two tracks of encoder regions, each region comprising a magnetic pole, the poles along each track being arranged as an alternating pattern of North and South poles, and one or more sensors, each sensor comprising one or more sensing elements associated with a respective track and generating an output that is indicative of the magnetic field associated with that track in the vicinity of the sensor, in which at least one track has a differing number of poles to at least one of the other tracks, and in which the properties of the poles of a first one of the tracks differ along the track such that there is a periodic variation along the first track of the magnetic field emitted by the first track that is detected by the sensing elements associated with the first track which at least partially cancels out a corresponding periodic variation in field from the other tracks that is also detected by the sensing elements associated with the first track.

6 Claims, 7 Drawing Sheets

(56) References Cited

U.S. PATENT DOCUMENTS

| | | | | |
|---|---|---|---|---|
| 5,925,943 A * | 7/1999 | Chitayat | ............... | G01D 5/145 318/135 |
| 6,496,003 B1 * | 12/2002 | Okumura | ............... | G01D 5/145 324/207.2 |
| 7,573,259 B1 * | 8/2009 | Kreger | ............... | G01D 5/145 324/210 |
| 2009/0009160 A1 * | 1/2009 | LaCroix | ............... | G01D 5/145 324/207.25 |
| 2010/0127697 A1 * | 5/2010 | Storrie | ............... | G01D 5/145 324/207.24 |
| 2011/0187355 A1 | 8/2011 | Dixon et al. | | |
| 2013/0033259 A1 * | 2/2013 | Hara | ............... | G01R 33/072 324/207.13 |
| 2013/0063138 A1 | 3/2013 | Takahashi et al. | | |
| 2015/0243427 A1 * | 8/2015 | Takahashi | ............. | H01F 13/003 335/284 |
| 2016/0146630 A1 * | 5/2016 | Takahashi | ............... | G01D 5/14 324/207.25 |
| 2017/0219380 A1 | 8/2017 | Schaefer | | |
| 2017/0276740 A1 | 9/2017 | Schmitt et al. | | |
| 2018/0335442 A1 * | 11/2018 | Duch | ............... | F16C 41/007 |
| 2021/0135546 A1 * | 5/2021 | Sinz | ............... | G01D 5/145 |
| 2021/0255003 A1 * | 8/2021 | Ong | ............... | G01D 5/145 |
| 2022/0099118 A1 * | 3/2022 | Suzuki | ............... | F16B 4/004 |

FOREIGN PATENT DOCUMENTS

| | | |
|---|---|---|
| EP | 3023746 A1 | 5/2016 |
| GB | 1235857 A | 6/1971 |
| JP | 2011112471 A | 6/2011 |
| WO | 2020/005160 A1 | 1/2020 |

OTHER PUBLICATIONS

GB Search Report for corresponding Application Serial No. GB2003064.9, dated Aug. 21, 2020, pp. 1-2.

* cited by examiner

MAGNETIC ENCODER

RELATED APPLICATIONS

The present invention claims priority from Application No. 2003064.9, filed 3 Mar. 2020, the entirety of which is incorporated herein by reference.

TECHNICAL FIELD

This invention relates to improvements in magnetic encoders, and in particular has application to small format multi-track linear or rotary encoders.

BACKGROUND

A linear or rotary magnetic encoder can be used to measure position and is commonly used to measure the linear motion or rotary position of an object such as a motor rotor. The encoder typically comprises three main components. The first is an encoder element that has a plurality of encoding regions arranged along at least one elongate track. For a linear encoder the track will be linear and extend from one end of the encoder to the other, and for a rotary encoder the track will be curved to form an endless annular track around an axis of rotation. A set of sensors are located adjacent the encoder that detects the passing of the encoder regions as the encoder translates or rotates around the axis, and finally a signal processor is provided that processes the output signals from the sensors. The encoder may function as an incremental encoder or an absolute position encoder, the difference lying in the way the sensor responds to the passing encoder regions and how the output signal is processed by the signal processor.

SUMMARY

In a typical magnetic encoder the encoder element comprises a set of magnetised regions arranged along a track comprising an alternating pattern or North and South poles. As the encoder moves, the poles move relative to the sensor. The sensor detects the changing magnetic field and this produces a corresponding change in the output of the sensor.

The magnetic poles can be formed by locally magnetising regions of a material which can be permanently magnetized, which may be formed into a disk or ring or other shape. In other arrangements individual magnets may be fixed to or embedded into a substrate at spaced locations to define the track.

In some applications it is beneficial to provide two tracks arranged in parallel for a linear encoder and around a common axis of rotation for a rotary encoder. If one track has wide magnetic poles and the other narrower magnetic poles, so that for a given length of track there are more poles on one track compared to the other, a high resolution incremental measurement can be taken using the sensors from the track with many poles combined with position in low resolution from the track with few poles. For instance, with a rotary encoder measuring the position of a motor rotor, when the motor starts, the first switch from the low resolution track can determine which way the rotor is pointing, and subsequently the track with many poles can provide very high resolution position for refined motor control.

The use of two parallel or concentric tracks may also provide the opportunity of fault diagnostics. For example, if when the sensors give a signal from the few pole track that does not agree with the signal from the many pole track, there may be a fault with one of the sensors.

Where there are two tracks, a set of sensors may be associated with each track with each set responding to the change in the magnetic field due to movements of magnets in a respective track. By using different numbers of encoder regions in each track and by offsetting at least some of the transitions between adjacent encoder regions of one track from those of the other track- or offsetting the sensors- and comparing the output from both sensing elements the position and direction of rotation can be determined. This is very well known in the art.

The applicant has identified a problem with magnetic encoders that have two adjacent tracks that is exaggerated where the encoder is small. In some applications, such as the measurement of the angular position and direction of a motor rotor the packaging constraints may be very severe which means that the encoder disk that carries the two concentrically tracks of magnets has to have a small diameter. This dictates the use of small magnetic encoder regions and packing those regions close together. The applicant has observed that the small size and close proximity of the magnets can result in the magnetic field from the magnets of the inner track affecting the magnetic field of the magnets of the outer track and vice versa. This interference will vary around the track due to the different numbers of magnets used in each track and the offset of magnets between tracks. Also, due to manufacturing tolerances, the location of the field sensors may vary from one encoder to the next, and hence the strength and harmonic content of the fields sensed from each of the different tracks as the disk rotates past the sensor elements will be different, and hence the harmonic content of the summation of the fields will be different, and hence the harmonic distortion of the sensor outputs will vary from one encoder to the next.

In a practical arrangement, the encoder element will need to be supported by a backing portion that enables the encoder element in turn to be fixed to a moving component. A suitable means for fixing of the backing portion to the encoder element is therefore needed.

One object of the present invention is to provide an encoder assembly that provides a secure fixing of the encoder to the backing portion in a manner that can be compact whilst at the same time reducing unwanted effect of harmonic noise due to the interaction of fields between tracks.

According to a first aspect, the invention provides a magnetic encoder comprising of an encoder element including one or more magnetized elements that in use is fixed to a backing member, the one or more elements together defining at least two tracks of encoder regions, each region comprising a magnetic pole, the poles along each track being arranged as an alternating pattern of North and South poles, And at least one sensor fixed in a location relative to which the location of the magnetized elements of the tracks are to be determined;

characterised in that the magnetic encoder includes at least one feature that simultaneously provides a location for a mechanical fixing that secures the magnetized elements relative to the moving part and that contributes to a periodic variation along a first track of the magnetic field emitted by the first track that is detected by the sensing elements associated with the first track which at least partially cancels out a corresponding periodic variation in field from the other tracks that is also detected by the sensing elements associated with the first track.

The feature may comprise at least one of: a difference in the properties of one or more of the poles of the first track relative to other poles in the first track, and the properties of at least one non-magnetized portion of the track in between a pair of adjacent poles of the first track, or adjacent to at least one pole of the first track.

The feature may define a keying portion that provides a mechanical attachment point for a mechanical fixing.

The keying portion may be a hole within the encoder element, or an edge of a pole, or an inter pole region of the encoder element, or a region of the encoder element offset from the first track and adjacent to one or more of the poles of the first track, that in each case may engage with a part of the mechanical fixing.

The feature may receive a portion of the mechanical fixing that engages the track or a space between poles in the track or adjacent one or more poles in the track that interferes with the magnetic field of one or more of the poles it is adjacent to.

The encoder may include a backing member that supports the encoder element and a mechanical fixing that engages both the backing member.

The skilled person understand that the term periodic variation in the context of the rotary motion of a rotary encoder refers to a harmonic frequency that can be observed in the output of the sensors assembly which is a harmonic of the rotational frequency of the encoder. For example a 4th order harmonic means 4 periods per one revolution. For a linear encoder where the poles move with a linear motion, the term harmonic refers to a frequency that can be observed in the output of the sensor assembly that is a function of the speed of the linear motion, with increase speed increasing the frequency of the periodic variation.

The periodic variation in field along the length of the first track, and the keying portions, may simultaneously be achieved by using at least two different designs of poles to form the first track, the two designs being different in the properties of shape and optionally also at least one of: area, magnetic strength and orientation compared with the poles of the other set, or proximity to other magnetic material.

The poles may be considered to form two sets of poles; one of a first design and other of a second different design. In some arrangements more than two sets of poles may be present in the track. A set may comprise one or more than one pole.

The mechanical fixing that engages the one or more keying portions of the encoder element may prevent movement of the encoder relative to the backing member in all directions.

The keying portion may comprise an extended edge portion of a pole relative to the shape of poles without the keying portion. Alternatively it may comprise a radial shoulder defined by a regular pole of a pole pair that is placed alongside a pole that is cut away to expose that radial shoulder. In another alternative a pair of poles may define a wider gap between the poles, the gap including a hole that acts as the keying portion. The wider gap may be generated by reducing the width of one or both poles along the track, hence varying the field compared with other poles defining a smaller gap.

The keying portion may comprise a hole located within the boundary of one or both of a pair of poles through which a part of the mechanical fixing may pass.

Most preferably, the keying portion may comprise a cut-away edge portion of the pole relative to the shape of poles without the keying portion.

In each case the magnetic field strength of the pole may be constant for a given pole area, so that poles that are smaller have a lower overall field strength than poles that are larger.

Providing poles having cut away portions that receive the mechanical fixing in regions where the effect of inter-track field is compensated ensures that the cut outs for the mechanical fixing have a beneficial impact on the performance without the need to increase the overall size of the assembly as portions are cut-away to receive the fixing.

By the term extended or cut-away we mean that the shapes of a pole with a keying portion and one without when viewed in plan and in register are substantially similar and of the same size so that they wholly overlap apart from an additional part or missing part of the second shape which can be thought of as being cut-away. It may be that portions of poles have been physically cut away. It will be understood that this does not necessarily mean it has been physically cut-away, simply that it is missing from that shape compared to the other, and that this might be achieved by magnetizing a different shaped region of material, or by removal of portions of material, or by the shape of the magnetized component.

The applicant has appreciated that changing the design of a set of poles, perhaps by removing material from some poles of the first track compared with others, decreases pole area to moderate the field in some poles to mitigate effects of superposition of field from the neighbouring track. Therefore, although an additional unwanted magnetic field from the second track is present in some regions it can be compensated for by an equal and opposite change to the actual magnetic field of the first track in those regions so that overall the unwanted magnetic field is not observed by the sensors.

The encoder element may comprise a single item such as a disk or strip of magnetisable material. Alternatively, each track may be provided on a separate item, the two fixed so they do not move relative to one another.

Different shapes poles may be provided by removing portions of magnetized material from the encoder element during manufacture, for example, provide holes through the material, straight edges, slots, corners, or other keying features.

The encoder element may be arranged such that poles of reduced field strength, for instance by having a reduced area, in the first track relative to other poles in that track Smaller field poles may be located where field from other tracks caused maximum reinforcement of the field from the first track. Larger poles may be provided where the field from other tracks causes maximum cancellation of field from the first track. Hence small poles may be located at only half the regions where interference is greatest.

The poles of the second track may all have the same shape and may be spaced uniformly along the track on the encoder element. Only the shapes of poles of the one track may therefore be varied It may or may not be that the poles of the second track all have the same shape and may or may not be spaced uniformly along the track on the encoder element. It may or may not be that only the shapes of poles of one track are varied.

The encoder may be a linear encoder in which case each track will comprise a linear array of poles arranged in parallel with the other track.

Alternatively the encoder may be a rotary encoder with the two tracks arranged arranged around a common axis. The tracks may be arranged concentrically on a disk shaped element, or may be of the same radius but axially displaced from each other, hence parallel. In the later case the tracks may be formed on a tubular element.

Where the tracks are concentric the first track may be an outer track of a rotary encoder, or may be an inner track.

The first track may comprise a plurality of narrow poles compared with the wider poles of second track, such that the first track has more poles along a given length compared to the second track. By wide or narrow we refer to the width of the pole measured along the direction of the track, which will be around a circumference in the case of a rotary encoder.

The narrower poles of the first track may be cut-away at the inner radius of that track if that is closer to the second track, or the outer radius if that is closer to the second track, in order to provide an effective cancellation of fields from the second track interfering with fields from the first track.

Alternatively, the second track may comprise a plurality of narrow poles compared with the first track, such that the second track has more poles along a given length compared to the first track. In this case the narrower poles of the second track may be cut-away at the inner radius of that track if that is closer to the first track, or the outer radius if that is closer to the first track, in order to provide an effective cancellation of fields from the first track interfering with fields from the second track.

In one embodiment the encoder may be a rotary encoder. The first track may be located concentrically around the second track, and the poles of the first track may extend to the edge of the disk, the fixing mechanism engaging with keying portions provided at the outer perimeter of the disk.

The first track may include arcuate shaped poles that have a curved outermost circumferential edge that defines a curved outer edge of the encoder disk along a path of radius r and other poles that include features defining keying portions may have an outermost edge that extends in a straight line that forms a chord to the path r. The overall area of these first shaped poles will therefore be less than the area of the first shaped poles as a bit is missing or cut-away. This cut-away portion will comprise the circular segment that would otherwise be enclosed between a chord and an arc whose endpoints join the end point of the chord, this arc having the radius r of the outer edge of the encoder disk.

The fixing mechanism may engage with the flat outermost edges. Because they extend along a chord, this engagement will prevent rotation of the encoder disk.

As an alternative to a straight outer edge for the second shape of pole, another shape may be used for the keying portions provided it does not follow entirely a path of radius r.

The encoder disk may have an outer edge that is tapered inwards away from the backing portion, so that the disk forms a truncated cone, and the fixing means may extend up along the outer edge and be tapered inwards towards the centre of the encoder disk to form an undercut which receives the outer edge. In this way the fixing mechanism wraps around the outer edge, helping prevent axial movement of the disk relative to the backing element.

The side of the encoder disk that faces away from the sensors, forming an underside of the encoder disk, may be conical, such that the disk has a larger radius near the centre and decreases in radius moving away from the centre. The surface of the encoder disk facing the sensors may be flat.

The backing portion may be trapped between the fixing element and the backing portion. The fixing element may include a body part that is located on a side of the backing portion opposite to the encoder element and a side wall that wraps around an edge of both the backing portion and the encoder element to fix them together.

The fixing mechanism may comprise a can having a base part that is substantially complimentary to an external face of the backing portion that faces away from the encoder disk, and an upstanding perimeter wall that embraces an outermost edge of the backing portion and also an outermost edge of the encoder disk.

The perimeter wall may extend continuously around the circumference of the base portion, or may be discontinuous to define a set of engaging fingers, each engaging a respective keying portion.

The mechanical fixing mechanism may comprise a metal component.

The backing portion may comprise a disk shaped body having an upper surface that is substantially complimentary to the underside of the encoder element. For instance, this may be concave if the underside of the encoder disk is convex.

A stem may extend away from the side of the backing portion that faces away from the encoder disk.

The stem may be hollow to permit the backing portion to be threaded onto a shaft, such as a rotor shaft of a motor.

The encoder apparatus may further include an adhesive pad which adheres the backing portion to the underside of the encoder disk. This will help prevent axial and radial movement as a back up to the fixing mechanism.

Each pole may have a curved inner edge, and two radially extending linear outer edges.

The curved inner edges, where provided, may lie on a circular path that extends around an axis of rotation of the encoder.

One or more of the poles may be provided with at least one hole within the perimeter of the magnetised pole which may be unfilled or may be filled with a magnetic material that has a different field strength to the surrounding region of the pole so as to alter the magnetic field of the pole compared with other poles in the track.

The reader will understand that the two tracks may comprise a first track which is arranged concentrically outside of a second track. Alternatively, the first track may be arranged concentrically outside of the second track.

The outer track may include more poles than the inner track.

Each pole of the first track may have a different shape, the poles being completely bespoke for the application or there may be multiple poles in the first track that have a first shape and multiple poles that have a second shape. There may be poles of a third shape, or even more shapes.

The encoder may be arranged such that where a North pole on a track with high number of poles is near a North pole on the other track with low number of poles, the area of the north poles on the large pole number track is decreased for large measurement gaps.

Alternatively the area of the special poles may be increased on the large pole number track for small measurement gaps. By measurement gap we mean the physical spacing between the encoder element track and an associated sensor of the complete encoder.

In a most preferred arrangement, the encoder element comprises two concentric annular tracks of magnetic encoder regions, each comprising a North or South pole, the outer track defining a first track comprising a first set of regular encoder regions and a second set of special regions, whereby the disk has a generally circular perimeter that defines an outer perimeter of the regular encoder regions and where an inner edge of one or more of the poles of the outer track differ from other poles of the outer track to achieve the desired compensation of the inter track field distortion and optionally to provide a region for the location for the mechanical fixing.

The rotary magnetic encoder may include a signal processor which receives the output from the sensors of the two sensor assemblies and processes the multiple outputs to provide a signal indicative of the angular position of the encoder element.

BRIEF DESCRIPTION OF THE DRAWINGS

There will now be described, by way of example only, various embodiments of the present invention with reference to the accompanying drawings of which.

DESCRIPTION

Figure 1:
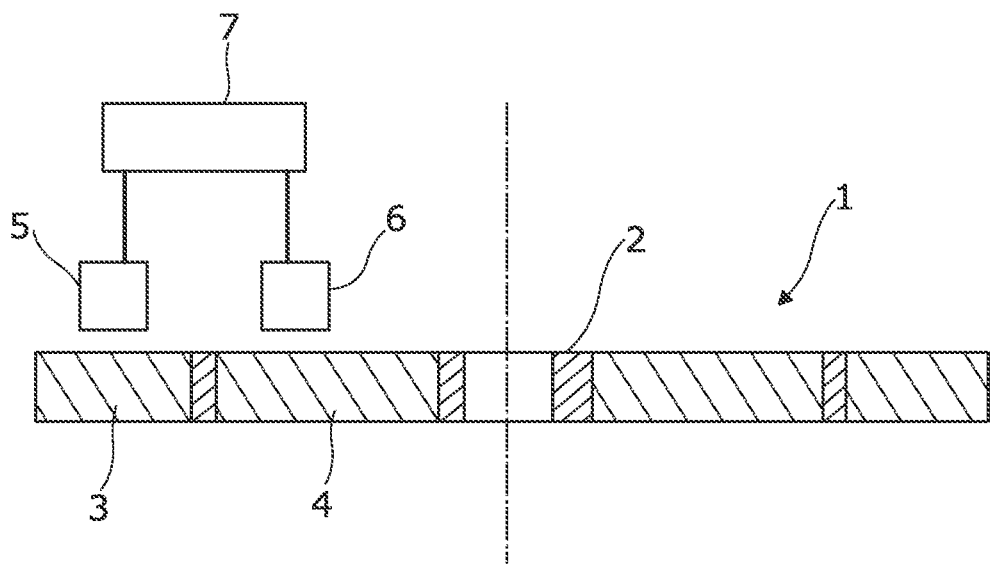
FIG. 1 is a cross sectional view showing the key components of a rotary encoder assembly in accordance with the present invention.
Figure 2:
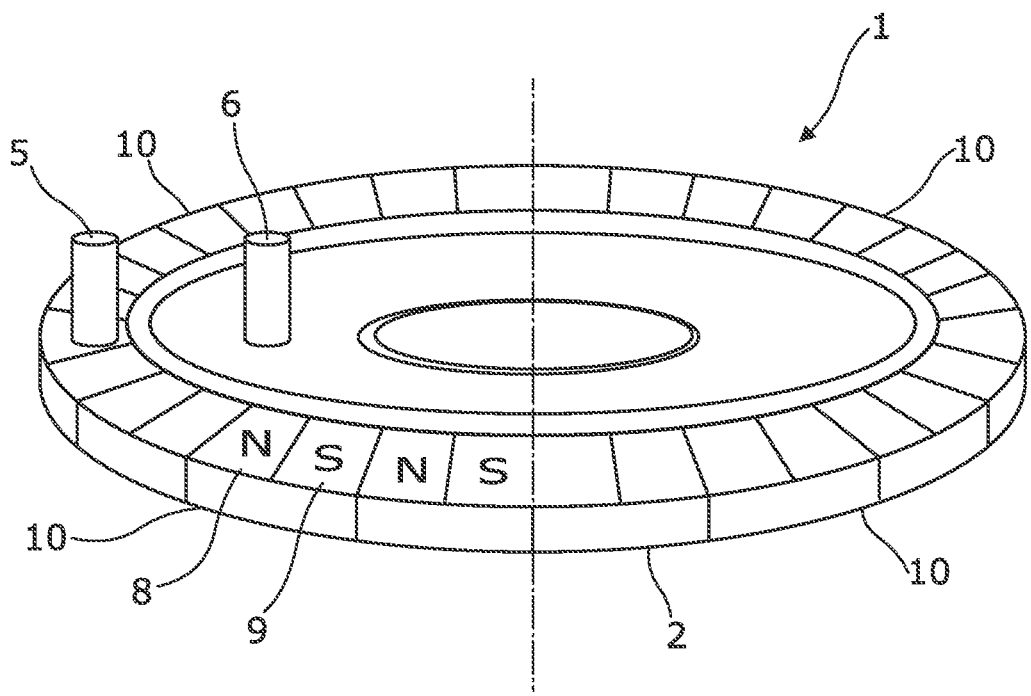
FIG. 2 is a perspective view of the rotary encoder assembly of FIG. 1.

As shown in FIGS. 1 and 2, an example of a rotary encoder 1 in accordance with the present invention comprises an encoder element 2 of magnetisable material. The disk has a central hole allowing it to be threaded onto a rotor shaft of a motor or other rotating object. The disk has a number of regions 8, 9 that are magnetised separated by regions of unmagnetised material. Each magnetised region forms a North or South magnetic pole. The poles are arranged to form two concentric tracks 3, 4 each centred on the axis of the metal disk. The outer track in this example comprises 32 poles arranged as alternating North and South poles that extend right to the outer edge of the metal disk. The inner track comprise 8 magnetic poles arranged as alternating North and South poles that extend right to the inner edge of the disk. In other examples there may be different numbers of poles in the inner and outer tracks.

Taking the poles to the edges allows the size of the poles to be maximised for a given size of disk, which is important where the size of the disk is limited due to the geometry of the location in which the encoder is to be placed in use. FIG. 2 shows how the disk forms a truncated cone due to a taper of the outer edge of the disk.

Two sensors 5, 6 are provided, each comprising multiple magnetic sensor elements that are responsive to magnetic field. One sensor 5 is placed with its sensor elements position with their detecting regions adjacent the first track 3 and the other sensor 6 is placed such that the sensing region of its sensor elements is adjacent the second track 4. The output of the two sensors 5, 6 is fed into a signal processing unit 7. This signal processing unit processes the signals to produce a measurement of the angular position of the metal disk relative to the sensors in a conventional manner.

In the examples of a rotary encoder, the encoder element has a small overall diameter with a nominal inner diameter of around 12 mm and a nominal outer diameter of around 19 mm. The range of the axial height between the surface of the encoder element and each of the two sensors is between 0.8-1.5 mm.

The applicant has appreciated that for small diameter encoders there is a high likelihood of inter-track magnetic interference. This may manifest as harmonic distortion of the signal output form each sensor compared with the ideal signal that would be present when there was no interference. For an encoder as shown in FIG. 2 with two tracks each having identical poles spaced around the track, the applicant observed that at the minimum height, the inner track field is strong enough that the outer track field 4th order effect on that inner track is very low and does not interfere. However, the further the sensor, the cross-talk between the inner and outer track becomes higher which is mainly due to lower field amplitude of the outer track compared to the inner track. On the other hand a strong fourth order harmonic was observed where the magnetic field of the inner track interferes with the outer track. The problem is also more exaggerated for small diameter sensor elements because the field strength of the relatively large poles decays less quickly with distance than from the small poles, hence more interference at larger gaps between the poles and sensor elements.

Figure 3:
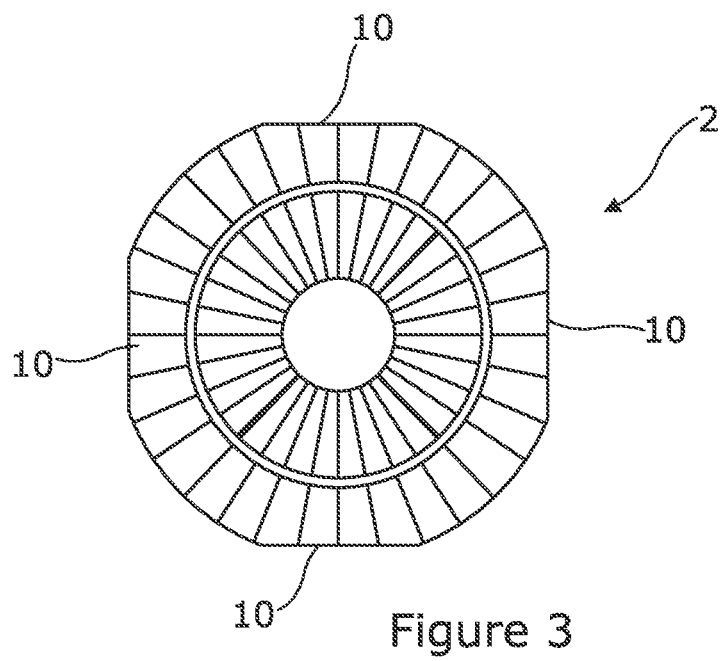
FIG. 3 shows an encoder element in plan view having four flats defining keying portions provided around an otherwise circular outer perimeter.

The applicant has proposed an alternative arrangement of encoder element which ameliorates the inter-track magnetic field interference and also allows for the encoder element to be securely supported by a backing portion. An example of a suitable encoder disk that includes features that achieve the desired effect is shown in FIG. 3. This has a number of poles of the outer track that have cutaway portions on their outermost edge to form four flat keying portions 10, resulting in a reduction in the area of the pole and hence a smaller field compared with the other poles. These define four equal-spaced key regions 10, each 90 degrees apart around the disk.

The poles with the flats define features that simultaneously provide for a secure fixing and a beneficial modification of the field pattern along the track.

The arrangement of the cut-aways in the example reduces the interference between the inner one of the tracks on the outer track to reduce $4^{th}$ order interference.

It can be shown that reducing poles in the outer track of like polarity to the neighbouring poles in the inner has is most effective at reducing the 4th order cross-coupling. On the other hand, if outer track poles of opposite polarity to the neighbouring inner track poles are reduced, this will increase the 4th order interference.

Figure 4:
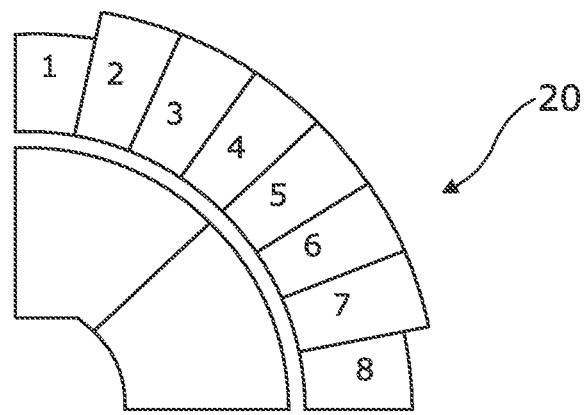
FIG. 4 shows an alternative arrangement of encoder disk having a central set of poles are enlarged compared with the two end poles.
Figure 5:
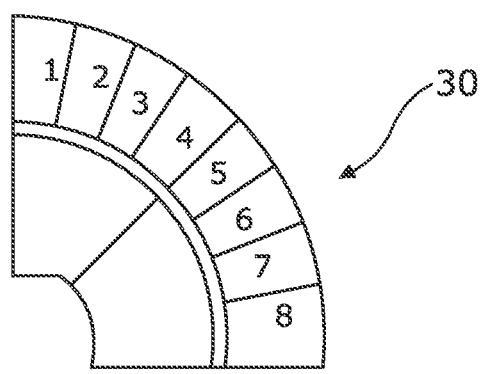
FIG. 5 shows in more detail a practical arrangement of an encoder disk where the steel inserts are provided on the outer edge of the end poles to align with the outer edge of the enlarged central poles giving magnetic poles of different strengths, the lighter shaded poles having a reduced field strength compared with the darker shaded poles as a consequence.

Other arrangements are shown in FIGS. 4 and 5, with FIG. 4 having a step change in radius of the disk as the keying feature, and FIG. 5 varying the strength of certain poles by adding steel inserts to the edges. Weaker poles are shown with light shading and stronger poles by dark shading.

FIGS. 7 to 11 show how the encoder disk is supported by a backing member. The backing member, seen best in FIGS. 7 and 9, comprises a disk shaped body that has an upper surface that is complimentary to the underside of the encoder disk. The encoder disk 2 is secured to this surface using an adhesive pad 11 shown in FIG. 7. A tubular stem 14 extends away from the side of the backing member that faces away from the encoder disk 2. This may be sized to be a sliding fit onto a shaft (not shown) which is rotating and on which the sensor is to provide measurements.

To further secure the encoder disk 2 to the backing member 12 a mechanical fixing 13 is provided. This is best seen in FIGS. 10(a) and 10(b).

Figure 10A:
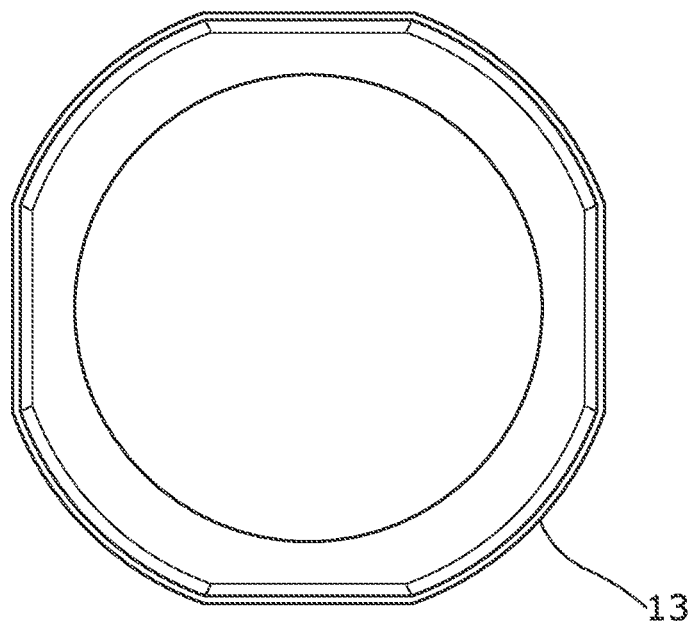
FIGS. 10 (*a*) and (*b*) are views of the mechanical fixing that secures the encoder disk to the backing member.
Figure 10B:
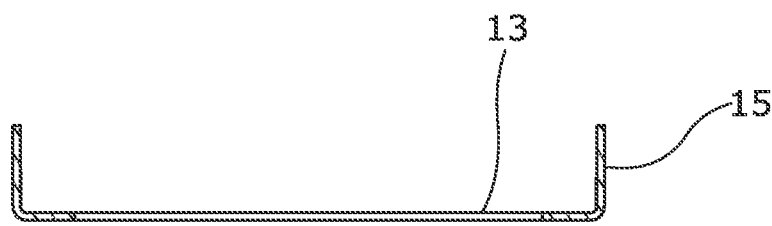
Figure 11A:
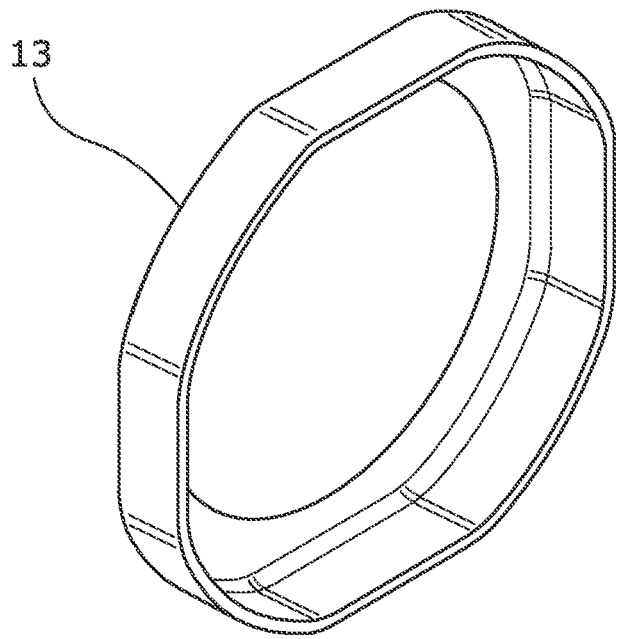
FIGS. 11 (*a*) and (*b*) is an alternative pair of views of the mechanical fixing prior to being installed and deformed to conform to the outer edge of the encoder disk.
Figure 11B:
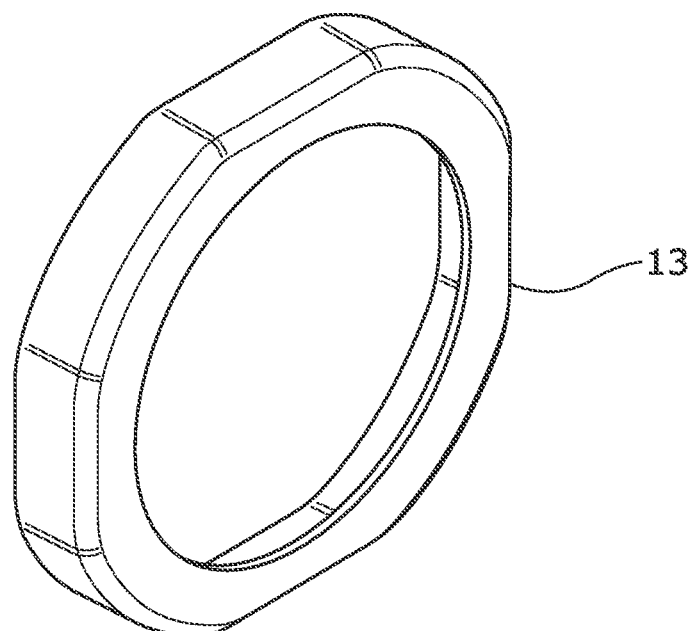

As shown in FIGS. 10(a) and 10(b), the mechanical fixing comprises a can having a disk shaped base part that is substantially complimentary to an external face of the backing portion that faces away from the encoder disk. An upstanding perimeter wall projects from the outer edge of that disk and embraces an outermost edge of the backing portion and also an outermost edge of the encoder disk. This engages the keying portions and this engagement prevents any rotation of the encoder disk relative to the backing portion. In the assembled configuration shown in FIG. 8 the walls 15 wrap around the conical edge of the encoder disk 2 to form an undercut, preventing the disk being axially displaced relative to the backing member if the adhesive pad was to fail.

Other arrangements of features are possible, such as providing holes within one or more poles into which portions of the fixing mechanism are located, or holes between poles within the tracks or alongside a track. In each case the feature that allows location, such as a hole, should also simultaneously contribute to the reduction or removal of any inter track distortion of the magnetic fields.

Figure 6:
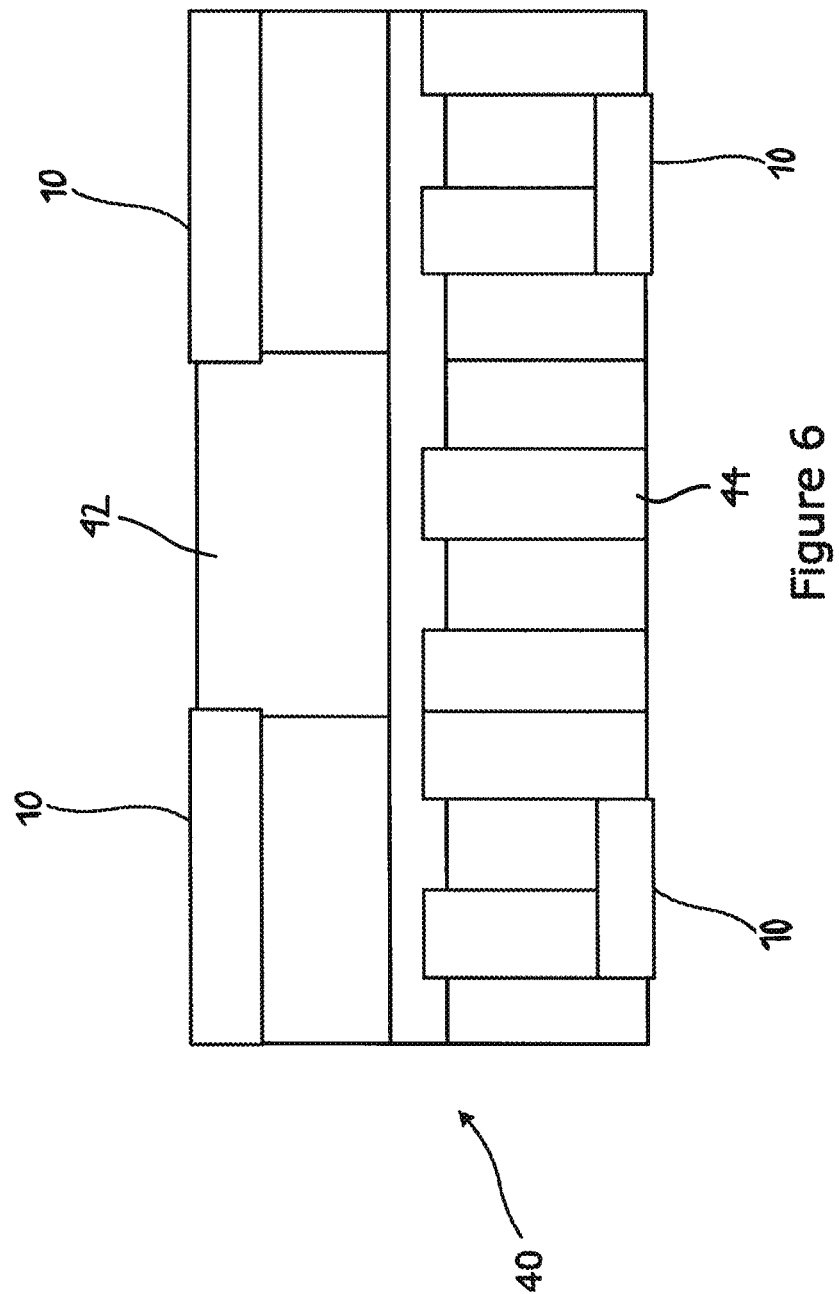
FIG. 6 is a schematic of an encoder element of a linear encoder use in a linear implementation of the invention.
Figure 7:
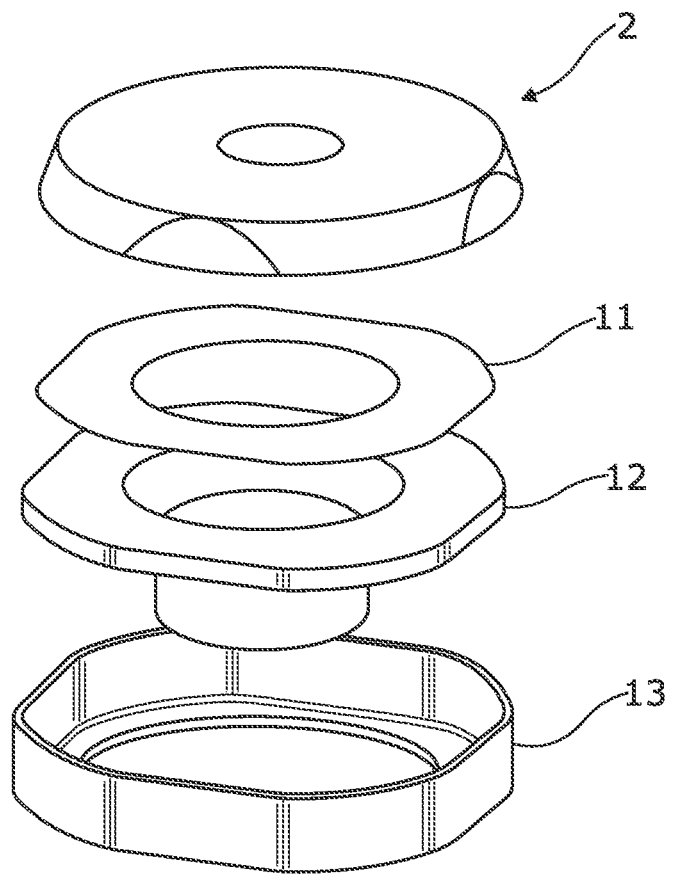
FIG. 7 is an exploded view of the rotating components of an embodiment of a rotary magnetic encoder in accordance with the present invention with the sensors assembly omitted for clarity.
Figure 8:
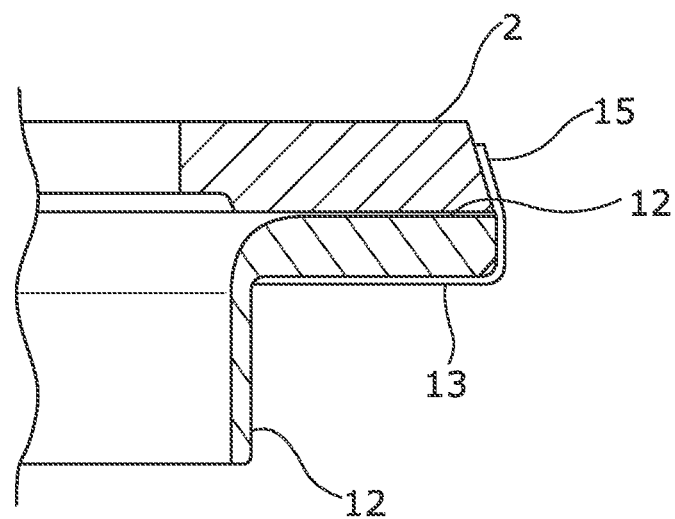
FIG. 8 is a partial cross sectional view of the encoder of FIG. 7 showing how the encoder disk is fixed to the backing member.
Figure 9A:
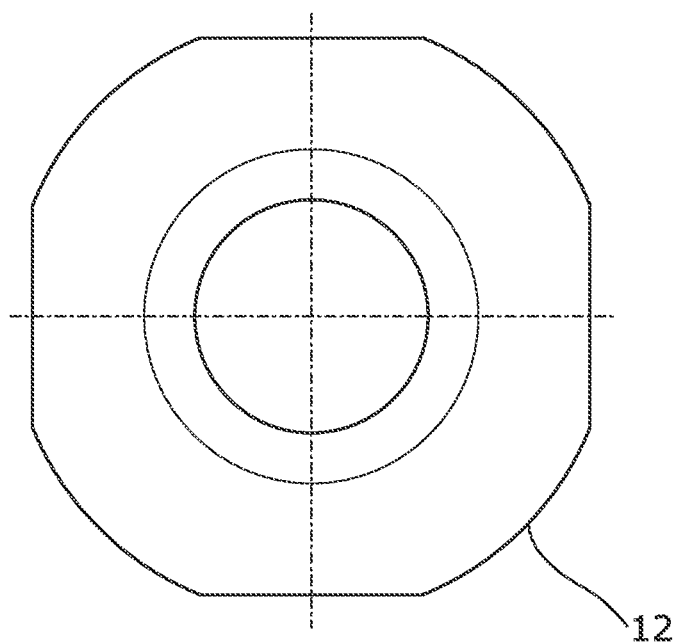
FIGS. 9(*a*) and (*b*) are views of the backing member.
Figure 9B:
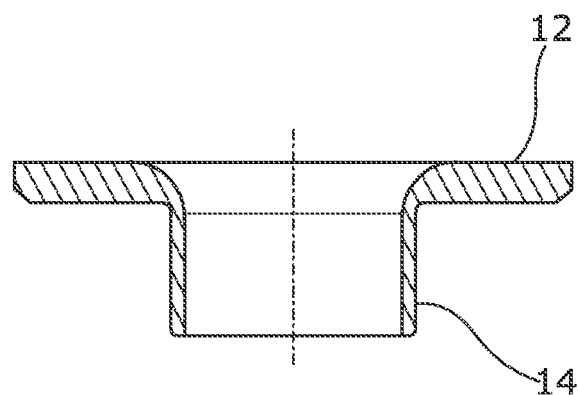

FIG. 6 shows how the invention can be applied to a linear encoder element, with a section of an encoder element 40 being shown, the section being repeated as required depending on the length of the encoder. As shown one track 42 has three elements for every 12 of the other track 44 and the track 44 with the narrower poles has two different pole shapes. The inner edge of the poles facing the track 42 with the wider poles is varied between the two designs, the magnetisation and shape and material otherwise being the same.

What is claimed is:

1. A magnetic encoder comprising:
a disk shaped, rotary encoder element (2) including one or more magnetized elements that in use is fixed to a backing member (12), the one or more elements together defining first and second tracks (3, 4) of encoder regions in which the first track (3) is located concentrically around the second track (4), each region comprising a magnetic pole, the poles along each track (3, 4) being arranged as an alternating pattern of North and South poles, the poles of the first track (3) extending to the edge of the encoder element (2) to give a perimeter that at least partially extends around a circular path of radius r, and at least one sensor (5, 6) fixed in a location relative to which the location of the magnetized elements of the tracks (3, 4) are to be determined;

wherein the magnetic encoder includes at least one feature for simultaneously providing a location for a mechanical fixing (13) that secures the magnetized elements relative to the moving part and that contributes to a periodic variation along the first track (3) of the magnetic field emitted by the first track (3) that is detected by the sensing elements associated with the first track (3) which at least partially cancels out a corresponding periodic variation in field from the other tracks that is also detected by the sensing elements associated with the first track (3), the at least one feature comprising an outermost edge of the poles of the first track (3) that each extends in a straight line forming a chord to the path r.

2. A magnetic encoder according to claim 1 in which the feature comprises at least one of: a difference in the properties of one or more of the poles of the first track (3) relative to other poles in the first track (3), the properties of at least one non-magnetized portion in between a pair of adjacent poles of the first track (3), and the properties of the at least one non-magnetized portion adjacent to at least one pole of the first track (3).

3. A magnetic encoder according to claim 1 in which the feature receives a portion of the mechanical fixing (13) that engages the first track or a space between poles in the first track or adjacent one or more poles in the first track that interferes with the magnetic field of one or more of the poles it is adjacent to.

4. A magnetic encoder according to claim 1 in which the backing member (12) supports the encoder element (2) and the mechanical fixing (13) engages both the backing member (12) and the at least one feature.

5. A magnetic encoder according to claim 4 in which the encoder element (2) has an outer edge that is tapered inwards away from the backing portion, so that the disk forms a truncated cone, and the mechanical fixing (13) extends up along the outer edge and tapers inwards towards the centre of the encoder disk to form an undercut which receives the outer edge.

6. A magnetic encoder according to claim 4 in which the mechanical fixing (13) comprises a can having a base part that is substantially complimentary to an external face of the backing portion that faces away from the encoder disk, and an upstanding perimeter wall that embraces an outermost edge of the backing portion and also an outermost edge of the encoder disk.

* * * * *